Figure 1:
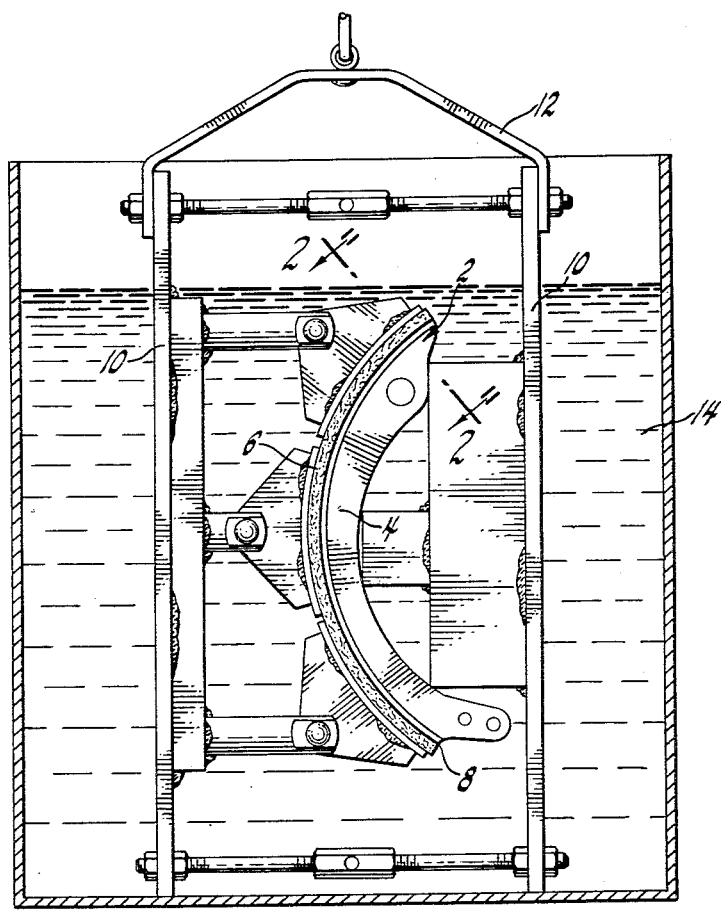

Feb. 22, 1955  A. J. KEARFOTT ET AL  2,702,771
METHOD OF BONDING FRICTION MATERIAL TO A SUPPORT MEMBER
Filed July 18, 1952

INVENTORS
Arman J. Kearfott, &
BY Robert K. Williams
Willits, Helwig & Baillie
ATTORNEYS

2,702,771

METHOD OF BONDING FRICTION MATERIAL TO A SUPPORT MEMBER

Arman J. Kearfott, Highland Park, and Robert K. Williams, Detroit, Mich., assignors to General Motors Corporation, Detroit, Mich., a corporation of Delaware Application July 18, 1952, Serial No. 299,748

6 Claims. (Cl. 154—81)

This invention is a continuation-in-part of that disclosed in S. N. 106,973 filed July 26, 1949, now abandoned, and relates to the curing of thermosetting resin materials. More particularly this invention relates to the curing of adhesive bonds between friction surfaces and the support members.

Since it has been considered necessary to remove all the grease, oil and oxide from the surfaces of the friction material before bonding, great care has been exercised in friction material bonding processes to clean the friction material supports and to keep them clean during the bonding process. Thus electric and gas fired ovens have been generally used to cure bonds between friction materials and their support. In accordance with the present invention the friction material supports are thoroughly cleaned of all foreign matter, such as oil, grease, gums, resins and oxides. Then the friction material is clamped to the support with a coating and/or tape of the bonding material or materials between the friction material and the support. Then the assembly is dipped in a bath of oil as hereinafter described, the oil being maintained at a temperature sufficiently high to cure the resin glues employed to bond the friction material to the support.

The coefficient of friction and the braking qualities of the conventional molded friction material or brake lining operating in the air are adversely affected by the presence of ordinary oil on the friction material. In accordance with this invention an oil of the type referred to in the trade as a soluble oil is used for the curing bath so that the oil does not adversely affect the friction material, and so that the oil may be rapidly and easily washed from the friction material after the bond has been completed.

The object of this invention is to provide in a process of bonding friction material to its support an oil bath heating means to cure the resin adhesive means employed between the friction material and the support.

Another object of this invention is to provide in a process of bonding friction material operable in air to the friction material support, a heating means for the friction assembly consisting of a soluble oil maintained at a high temperature in a vat and a washing tank with high temperature water.

Figure 2:
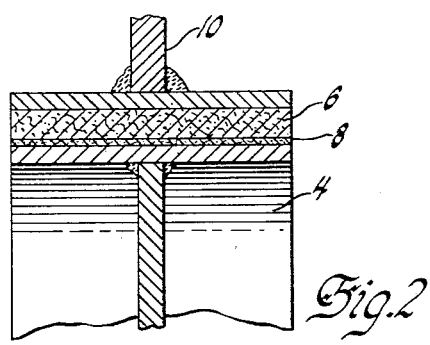

In the drawings:

Figure 1 is a side view in section of apparatus which may be used to practice the invention; and Figure 2 is a view taken on the line 2—2 of Figure 1 and shows the relationship of the brake shoe, the bonding material, the friction material and the clamping means which may be used in the practice of the invention.

In accordance with the invention the bonding surface of the friction material is kept clean and dust free, and the bonding surface of the friction material support is cleaned to remove all grease, oil, gum, resin, oxides and other dirt. Either one or both of the bonding surface may then be coated with liquid thermosetting bonding material. The liquid resins may be used either alone or in conjunction with a tape type bonding material. The tape type bonding material may also be used alone. Some exceptional bonding materials of the type consisting generally of a mixture of a thermosetting resin and an elastomer are disclosed by Robert E. Antheil in application Serial No. 724,050, filed January 24, 1947, Patent No. 2,631,961, and by Arman J. Kearfott et al. in application Serial No. 332,518, filed January 21, 1953, which is a continuation-in-part of application Serial No. 3,824, filed January 22, 1948, now abandoned.

After the friction material and the support element are assembled with the thermosetting resin bonding material between them, the assembly is securely clamped together with sufficient pressure so that all bonding surfaces are in contact with each other. The friction assembly is then dipped in a soluble oil bath maintained at a temperature above the curing temperature of the resin for a time sufficient to cure the resin bonding material. Of course, the exact temperature at which the soluble oil bath is maintained will depend on the curing temperature of the resin used. Generally resins of the types used for bonding purposes have curing temperatures within the range of from 250° F. to 350° F. and thus the soluble oil bath will generally be maintained at a temperature within this range. The dipping period will vary anywhere from one to fifteen minutes due to the differences in the heat conductivity of the friction material and the support member and the curing characteristics of the bonding material.

By the term soluble oil as herein used, we refer to those types of oils which are readily emulsifiable with water to form what in some instances appears to be a true solution but which is actually a very fine dispersion. Such oils generally consist of a mineral oil to which has been added one or more of various types of wetting or emulsifying agents and perhaps a small amount of water or other blending agent. Typical emulsifying or wetting agents used in such oils are the amine soaps and the petroleum sulfonates. These soluble oils, as they are referred to in the trade, are commonly used as lubricants and as cutting oils and as stated previously are characterized by their ability to form emulsions with water quite readily. Typical examples of such oils are "Seco" oil currently sold by the Sun Oil Company and "Superla" oil currently sold by the Standard Oil Company. These are given only as examples and it is to be understood that other oils having the same or similar properties and manufactured or distributed by other companies can be used for the curing bath within the full and intended scope of this invention.

In the preferred form of the invention the friction material brake shoe assembly consisting of a molded lining clamped to a brake shoe with the thermosetting resin bonding material therebetween is immersed for from one to fifteen minutes in a bath of soluble oil maintained at from 310° F. to 330° F., the soluble oil having a flash point of about 360° F. and a fire point of 400° F.

After the curing of the bonding resin is complete the assembly is cooled and washed with hot water. Because of the "soluble" properties of the oil as heretofore described it can be easily removed by this washing treatment.

Thus, though conventional oils are difficult to remove from the friction material and adversely affect the frictional characteristics of the lining, it has been found that the soluble oil can be readily removed with a water bath and that the frictional characteristics of the lining are not appreciably affected.

For the purpose of illustrating the invention, there is shown in the drawings a brake assembly 2 comprising a brake shoe 4 and a brake lining 6 with a layer of thermosetting bonding material 8 pressed therebetween. This assembly 2 is held tightly together, as shown, by a suitable clamping means 10. The clamped assembly is immersed by means of some suitable support, such as is shown at 12, into a bath of soluble oil 14 maintained at a temperature above that at which the bonding material 8 cures. After the assembly has been immersed for a sufficient period to cure the bonding material, it is removed from the bath and rinsed or washed with water so as to remove the soluble oil.

It will be obvious from the above disclosure that the process of this invention can be used for purposes other than the bonding of a friction material to a support member to form, for example, a dry-running friction assembly. The use of a soluble oil bath to cure thermosetting materials affords an economical and convenient process which lends itself to the manufacture of various types of plastic articles. The process is of course particularly useful for bonding friction material because of the necessity that such material be free of oil.

It is to be understood that, although the invention has

We claim:
1. A process for bonding a friction material to a support member including the steps of clamping the friction material to the support member with thermosetting resin bonding material therebetween and curing the resin in a water emulsifiable oil bath maintained at a temperature above the curing temperature of said bonding material.

2. A process of bonding friction material to a support member including the steps of placing a thermosetting resin bonding material between the friction material and the support member to form an assembly, clamping said friction material and said support member together so that the bonding material is in contact with both surfaces and placing said assembly in a water emulsifiable oil bath maintained at a temperature above the curing temperature of said resin for a period of time sufficient to cause curing of said resin.

3. A process for bonding a friction material to a support member including the steps of placing a thermosetting resin bonding material between the friction material and the support, clamping said friction material and support member together so the bonding material is in contact with both surfaces, curing said resin bonding material in a water emulsifiable oil bath and washing the bonded assembly with water to remove the water emulsifiable oil therefrom.

4. A process for bonding a resin impregnated fibrous friction material to a support member to thereby form a dry-running friction assembly including the steps of placing a phenolic thermosetting resin bonding material between said friction material and said support member, clamping said friction material and said support member together so that the bonding material therebetween is in contact with the mating surfaces thereof, placing said assembly in a bath of water emulsifiable oil having a flash point of at least about 360° F., maintaining said bath with said assembly therein at a temperature of from 250° F. to 350° F. to cure said resin thereby permanently bonding said friction material to said support member and thereafter washing said assembly in a hot water bath to remove the water emulsifiable oil therefrom and thus provide a friction member assembly having no impregnation of oil and the original coefficient of friction of said fibrous friction material being substantially unchanged.

5. A process for curing a thermosetting resin material including the step of immersing said material in a bath of water emulsifiable oil maintained at a temperature above the curing temperature of said resin material.

6. A process for curing a thermosetting resin material comprising the steps of placing said material on a support member, immersing said supported material in a water emulsifiable oil bath maintained at a temperature above the curing temperature of said resin material to cure said resin material and thereafter washing said resin material with water to remove the water emulsifiable oil therefrom.

References Cited in the file of this patent

UNITED STATES PATENTS

| Number | Name | Date |
|---|---|---|
| 1,417,778 | Stanley | May 30, 1922 |
| 1,595,811 | Anderson | Aug. 10, 1926 |
| 1,887,550 | Fix et al. | Nov. 15, 1932 |
| 2,556,709 | Schultz | June 12, 1951 |